United States Patent [19]
Baker et al.

[11] Patent Number: 4,594,259
[45] Date of Patent: Jun. 10, 1986

[54] TEMPERABLE CONFECTIONERY COMPOSITIONS HAVING IMPROVED MOUTH MELT SUITABLE FOR CHOCOLATE

[75] Inventors: Joseph S. Baker, Cincinnati; Phillip F. Pflaumer, Ross, both of Ohio

[73] Assignee: The Procter & Gamble Company, Cincinnati, Ohio

[21] Appl. No.: 684,515

[22] Filed: Dec. 21, 1984

[51] Int. Cl.$^4$ .......................... A23G 1/00; A23G 3/00
[52] U.S. Cl. ..................................... 426/613; 426/660
[58] Field of Search ................ 426/606, 607, 613, 660

[56] References Cited

U.S. PATENT DOCUMENTS

| | | |
|---|---|---|
| Re. 28,728 | 3/1976 | O'Connor et al. |
| Re. 28,729 | 3/1976 | Yetter. |
| Re. 28,737 | 3/1976 | Yetter. |
| 2,903,363 | 9/1959 | Farr. |
| 3,012,891 | 12/1961 | Best et al. |
| 3,070,445 | 12/1962 | Sinnema. |
| 3,084,049 | 4/1963 | Sinnema. |
| 3,093,480 | 6/1963 | Arnold et al. |
| 3,410,881 | 11/1963 | Martin et al. |
| 3,492,130 | 1/1970 | Harwood. |
| 3,686,240 | 8/1972 | Kawada et al. |
| 3,989,728 | 11/1976 | Martin. |
| 4,205,095 | 5/1980 | Pike et al. |
| 4,276,322 | 6/1981 | Padley et al. |
| 4,283,436 | 8/1981 | Soeters et al. |
| 4,348,423 | 9/1982 | Pairaud et al. |
| 4,364,688 | 12/1982 | Hargreaves. |
| 4,431,116 | 3/1964 | Feuge et al. |
| 4,465,703 | 8/1984 | Jasko et al. |

FOREIGN PATENT DOCUMENTS

| | | |
|---|---|---|
| 23062 | 1/1981 | European Pat. Off. |
| 72212 | 2/1983 | European Pat. Off. |
| 81881 | 6/1983 | European Pat. Off. |
| 83/00418 | 2/1983 | PCT Int'l Appl. |
| 827172 | 2/1960 | United Kingdom. |
| 893337 | 4/1962 | United Kingdom. |
| 2023636 | 1/1980 | United Kingdom. |
| 2028862 | 3/1980 | United Kingdom. |

OTHER PUBLICATIONS

Hilditch et al., "The Composition of Commercial Palm Oils: Partial Separation of Palm Oils by Crystallization as an Aid to the Determination of the Component Glycerides," *J. Soc. Chem. Indus.*, (1940), pp. 67–71.
Hilditch et al.; The Chemical Constituents of Natural Fats, (4th ed. 1964), pp. 385–386, 392, 431, 433, 439, 441.
Mattson et al., "Esterification of Hydroxy Compounds by Fatty Acid Anhydrides," *J. Lipid Res.*, vol. 5, (1964), pp. 374–377.
Feuge et al., "Cocoa Butter-Like Fats from Domestic Oils," *J. Am. Oil Chem. Soc.;* vol. 35, (1958), pp. 194–199.
Lehrian et al., "Triglyceride Characteristics of Cocoa Butter from Cacao Fruit Matured in a Microclimate of Elevated Temperature," *J. Am. Oil Chem. Soc.*, (Feb., 1980), pp. 66–69.
Feuge, "Production of Specialty Fats," *J. Am. Oil Chem. Soc.*, vol. 37, (1960), pp. 527–532.
Minifie, "*Chocolate, Cocoa and Confectionery: Science and Technology*" (1970), pp. 55–56.

*Primary Examiner*—Robert Yoncoskie
*Attorney, Agent, or Firm*—Eric W. Guttag; Steven J. Goldstein; Richard C. Witte

[57] ABSTRACT

Temperable confectionery compositions having improved mouth melt and firmness control are disclosed herein. These compositions comprise a fat component having, by weight of the fat component:
(a) at least about 70% SOS triglycerides;
(b) from about 4 to about 20% combined SUU/UU-U/SLS triglycerides;
(c) about 8% or less SLS triglycerides;
(d) about 9.5% or less SSO triglycerides;
(e) about 2.5% or less SSS triglycerides; and
(f) about 4% or less other glycerides;

wherein S is stearic (St) or palmitic (P); and U is oleic (O) or linoleic (L). The St:P weight ratio is about 0.8 or less. These confectionery compositions preferably comprise a flavor component containing a chocolate flavor, to form chocolate compositions.

13 Claims, No Drawings

TEMPERABLE CONFECTIONERY COMPOSITIONS HAVING IMPROVED MOUTH MELT SUITABLE FOR CHOCOLATE

TECHNICAL FIELD

The present application relates to temperable confectionery fat compositions having improved mouth melt, in particular those suitable for chocolate.

Chocolate derives its desirable eating qualities largely from the melting properties of cocoa butter which is typically present at about 32% by weight. At room temperature (70°–75° F.), cocoa butter is a solid. As a result, chocolate is also firm and solid. Firmness is desirable not only to provide "snap" at initial bite, but also to resist deformation and surface marking of the chocolate from time of manufacture to time of consumption.

Above room temperature, cocoa butter melts progressively until it is fully melted near 93°–94° F. As such, cocoa butter is entirely liquid below body temperature (98.6° F.). This rapid melting at mouth temperature ("mouth melt") provides a smooth, creamy consistency during eating and insures rapid release of chocolate flavors to the mouth. The relatively sharp melting behavior just a few degrees below body temperature is unique to cocoa butter among all known natural fats. Other natural fats melt at either higher or lower temperatures, with less sharpness in melting. Higher melting fats provide an undesirable "waxy" eating texture in the chocolate and a "waxy after-feel" in the mouth. Lower melting fats provide a softer choclate with less "snap" upon biting and greater susceptibility towards deformation and surface blemish.

The melting behavior of cocoa butter is the result of its unique triglyceride composition. Cocoa butter consists primarily (about 80% by weight) of saturated-oleic-saturated (SOS) triglycerides which melt near body temperature. These SOS triglycerides include the stearic-oleic-stearic (StOSt), palmitic-oleic-stearic (POSt) and palmitic-oleic-palmitic (POP) triglycerides. The remaining triglycerides are mostly the more unsaturated, lower-melting species such as StOO and POO triglycerides which constitute the liquid portion of cocoa butter at room temperature. Moreover, the higher-melting stearic triglycerides and the lower-melting palmitic triglycerides are present in a specific St:P weight ratio of 1.3±0.1, which has been deemed central to the unique melting properties of cocoa butter. For the important SOS triglycerides, this St:P ratio typically converts to about 48% POSt, about 35% StOSt, and about 17% POP triglycerides.

Although relatively good, the melting behavior of cocoa butter is still not ideal. The explanation for this less than ideal melting behavior can be found in the melting points for the pure SOS triglycerides:

| Triglycerides | Melting Point |
| --- | --- |
| StOSt | 44° C. (111° F.) |
| POSt | 38° C. (100° F.) |
| POP | 37° C. (99° F.) |

As can be seen, the StOSt triglycerides melt at a temperature significantly above that of the POSt and POP triglycerides. Because the StOSt triglycerides comprise a significant portion (35%) of the total SOS triglycerides in cocoa butter, the melting range of the triglyceride mixture is broadened which causes a less sharp melting. By decreasing the level of StOSt triglycerides, (i.e. lowering the St:P ratio), it has been found that a much sharper melting mixture can be produced. Also, the remaining POSt/POP triglycerides will be solubilized (melted) faster by the liquid triglycerides (e.g., POO) in the fat at below body temperatures.

Perhaps more importantly to the economics of chocolate making, cocoa butter has frequently been a scarce and therefore expensive fat. As a result, those in the chocolate industry have sought less expensive substitute fats. An important characteristic for such cocoa butter substitutes is tempering compatibility with cocoa butter. To provide the expected properties of mouth melt and firmness, the cocoa butter in chocolate must be properly tempered to form beta-3 seed crystals. These seed crystals serve as nucleation sites for rapidly converting the remainder of the cocoa butter fat to the solid beta-3 form during subsequent cooling of the molded or enrobed chocolate. Proper tempering is not straightforward because cocoa butter is polymorphic, i.e. can exist in several different crystaline forms other than beta-3. Cocoa butter can exist in the alpha form which changes at room temperature to the beta-prime form (melting point 80°–84° F.) which then changes more slowly to the stable beta-3 form (melting point of 93°–95° F.). A substitute which partially replaces cocoa butter in the chocolate or is blended with chocolate-liquor (which contains 50 to 58% cocoa butter) must have a triglyceride composition compatible with cocoa butter to form the necessary beta-3 seed crystals for subsequent rapid conversion to the solid beta-3 form. Otherwise, the chocolate formed during molding or enrobing will not have the proper firmness or mouth melt and will likely form bloom, i.e. an undesirable whitish or greyish formation visible on the surface of the chocolate but also present in the interior.

Cocoa butter substitutes are frequently derived from cheaper, naturally occurring fats such as Illipe butter (Borneo tallow), Shea butter, Mowrah fat, and especially palm oil. For example, British patent specification No. 827,176 to Best et al., published Feb. 3, 1960, discloses the preparation of cocoa butter substitutes by removing from palm oil at least 50% (preferably 60%) of a lower melting glyceride fraction, and by also preferably removing 5-15% of the highest melting glyceride fraction. See also Example 1 of U.S. Pat. No. 2,903,363 to Farr, issued Sept. 8, 1959, which discloses the double acetone fractionation of melted palm oil to obtain a fat suitable for chocolate coatings. Similarly, U.S. Pat. No. 3,093,480 to Arnold, issued June 11, 1963, discloses the preparation of cocoa butter substitutes by double acetone extraction of palm oil.

These palm oil derived fats are indicated to be useful as total or partial cocoa butter fat replacers in chocolate compositions. However, Best et al. and Arnold indicate a distinct preference for mixing these palm oil derived fats with other natural fats such as Shea or Illipe butter to form the cocoa butter substitute. See also U.S. Pat. No. 3,012,891 to Best et al., issued Dec. 12, 1961, (cocoa butter substitutes obtained by mixing palm oil fractions with Shea butter fractions); U.S. Pat. No. 4,364,868 to Hargreaves, issued Dec. 21, 1982 (cocoa butter replacement fats typically formed by blending palm mid-fraction fats, preferably interesterified at the 1,3-position, with other natural fats such as cocoa butter and Shea stearine). Similarly, synthetic POSt/StOSt fats have been blended with palm oil derived fats to obtain cocoa butter substitutes. See U.S. Pat. No. 4,276,322 to Padley et al., issued June 30, 1981 (chocolate compositions containing hard fats formed by blending palm mid-fractions with synthetic StOSt/POSt fats); U.S. Pat. No. 4,283,436 to Soeters et al., issued Aug. 31, 1981 (similar hard fat replacers for chocolate as disclosed in Padley et al.).

The total triglyceride composition of these palm oil derived fats (and blends with other fats), and especially the importance thereof to the firmness, mouth melt properties, and temperability of the cocoa butter substitute, is rarely discussed. To the extent it is, the focus of this art has been primarily on the level of SOS triglycerides in the substitute. Specifically, the emphasis has been on maximizing the level of these triglycerides, as in cocoa butter. Moreover, the importance of the St:P ratio of the fat, especially as reflected by the level of StOSt triglycerides, to mouth melt properties is unrecognized by this art. As such, the suitability of these palm oil derived fats (and blends thereof with other fats) as cocoa butter substitutes appears to be more the result of trial and error, rather than due to an understanding of the total triglyceride composition.

BACKGROUND ART

A. Synthetically Prepared Fats

U.S. Pat. No. RE. 28,737 to Yetter, reissued Mar. 16, 1976, discloses the esterification of 1,3-diglycerides with oleic anhydride using trifluoromethane sulfonic acid as the catalyst. Example 1 discloses a synthetic cocoa butter prepared by oleic anhydride esterification of a 1,3-diglyceride component containing 45%, 1,3-palmitostearin, 42% 1,3-distearin and 11% 1,3-dipalmitin. Example 2 discloses the esterification of 1,3-dipalmitin with oleic anhydride to obtain a fat containing 90–95% oleic acid at the 2-position.

U.S. Pat. No. 3,492,130 to Harwood, issued Jan. 27, 1970, discloses hard butter compositions stable in the beta crystalline form prepared from a mixture of 60–95% SUS triglycerides and 40–5% of an equal amount of SUU and SSU triglycerides. These hard butter compositions can be used as extenders or substitutes for cocoa butter. Examples of such compositions are shown in Table 1 and were prepared by appropriate mixing of POP (Example 2), POO (Example 4), and PPO (Example 5) fats. See in particular compositions No. 1 (100% POP fat) and No. 5 (90% POP, 5% POO and 5% PPO fats). According to this patent, the data in Table II would show that Composition No. 5 is a suitable hard butter while composition No. 1 is not.

European patent application No. 23,062 to Cotton et al., published Jan. 28, 1981, discloses a hard butter fat suitable for replacing 100% of the added cocoa butter in chocolate formulations. This hard butter comprises 75–90% SUS triglycerides and less than 13% combined SSU and SUU triglycerides with an St:P ratio of from 1:1 to 2:1. Example 2 discloses one such hard butter containing 83% SUS, 4% SSO and 1% SOO triglycerides with an St:P ratio of 1.9.

B. Cocoa Butter Substitutes Derived From Fractionated Palm Oil and Cocoa Butter

Example 1 of U.S. Pat. No. 2,903,363 to Farr, issued Sept. 8, 1959, discloses the acetone fractionation of melted palm oil to obtain a fat suitable for chocolate coatings. In this process, a mixture of palm oil and acetone is held at 60° F. to obtain a first set of crystals which are filtered off. The filtrate is then cooled to 30° F. to obtain a second crop of fat crystals used in the chocolate coating. Example 5 discloses acetone fractionation of liquid cocoa butter by a similar process to provide a fat suitable for chocolate coatings.

British patent specification No. 827,172 to Best et al., published Feb. 3, 1960, discloses the preparation of cocoa butter substitutes by removing from palm oil at least 50% (preferably 60%) of a lower melting glyceride fraction, and by also preferably removing 5–15% of the highest melting glyceride fraction. Milk chocolates containing 31.8% (Example 9), 96% (Example 10), and 50% (Example 11) of such fractionated fats (based on total fat) are disclosed. U.S. Pat. No. 4,276,322 to Padley et al. issued June 30, 1981, discloses one such fractionated fat having 76.5% SUS triglycerides, 8.3% SUU triglycerides, 7.1% SSU triglycerides and 3.1% SSS triglycerides.

U.S. Pat. No. 3,093,480 to Arnold, issued June 11, 1963, discloses the preparation of cocoa butter substitutes by acetone extraction of palm oil. In the first set of extractions, the lower melting fraction of the fat is removed using acetone at temperatures between −5° and 10° C. The solid fat from this first extraction is subjected to a second set of extractions with acetone between 10° and 35° C. to remove higher melting triglycerides. Example 7 discloses chocolate made with this extracted fat at 27, 50 and 93% of the total fat.

Feuge et al., "Cocoa Butter-like Fats from Domestic Oils," *J. Am. Oil Chem. Soc.,* Vol. 35, (1958), pp. 194–99, discloses the preparation of cocoa butter-like fats by esterifying glycerol with the respective fatty acids and then acetone fractionating the formed triglycerides. In this fractionation process, the triglycerides are dissolved in acetone and then held at 25° C. with a precipitate (trisaturated fraction) being removed. The remaining solution is cooled to 0° C. and the precipitate formed (monounsaturated fraction) removed to provide the cocoa butter substitute. Based on the melting characteristics of mixtures of these fats with cocoa butter, it was determined that the POP-type fat was the least compatible. Feuge et al. indicates that the probable cause of this incompatibility was the presence of certain isomers in the fat not found in cocoa butter.

C. Blends of Fractionated Palm Oil with StOSt/POSt Fats

U.S. Pat. No. 4,276,322 to Padley et al. issued June 30, 1981, discloses chocolate compositions containing hard fats formed by blending palm mid-fractions with StOSt/POSt fats. The StOSt/POSt fats consist of 80–98% StOSt and POSt triglycerides, less than 5% SSS triglycerides (other than PPP) and less than 5% PPP triglycerides (preferably less than 1% each of such triglycerides), less than 10% SSO triglycerides (other than PPO) and less than 3% PPO triglycerides (preferably less than 5% and more preferably less than 1% SSO triglycerides and preferably less than 1.5% PPO triglycerides), and less than 10% SOO triglycerides (preferably less than 5% of such triglycerides). See in particular POSt/palm mid-fraction blends disclosed at column 8, line 56 to column 9, line 32 of this patent. One such fat blend consisting of at least 40% POSt with the remainder being palm mid-fraction is disclosed to be useful at high levels in chocolate. Another such fat blend consisting of up to 50% palm mid-fraction with the remainder being POSt fat is disclosed as an excellent full fat replacer (can totally replace added cocoa butter) in the preparation of milk chocolate. See also U.S. Pat. No. 4,283,436 to Soeters et al. issued Aug. 31, 1981, which discloses similar hard fat replacers for chocolate.

U.S. Pat. No. 4,364,868 to Hargreaves, filed Feb. 2, 1981, issued Dec. 21, 1982, discloses "cocoa butter replacement" fats for chocolate compositions having certain proportions of POP/POSt/StOSt triglycerides defined by a ternary diagram. These fats can also contain up to 30%, preferably up to 20%, other triglycerides. These fats are typically formed by blending palm mid-fraction fats (preferably interesterified at the 1,3-positions using a lipase enzyme) with other fats such as cocoa butter and shea stearine. Examples 4–7 formed by blending cocoa butter with a palm mid-fraction (with or without subsequent interestification and fractionation) have POP/POSt/StOSt compositions of 45.6–47.1%/37.2–41%/12.4–16.8%. Example 8 discloses a fat (formed from stearic acid interesterified with a palm mid-fraction) having POP/POSt/StOSt composition of 33.9%/47.7%/18.4% which is blended with a palm mid-fraction to provide a fat (Example 9) with POP/PSOt/StOSt composition of 44.7%/41.1%/14.2%. Example 11 discloses a fat formed by blending Shea stearine with a POP fat in a ratio of 70:30 (?) to obtain a fat having POP/POSt/StOSt composition of 75.7%/3.0%/21.3%. Other than the fat of Example 4, the fats of these Examples are disclosed as useful confectionery fats.

DISCLOSURE OF THE INVENTION

The present invention relates to novel confectionery compositions having improved mouth melt properties when used in making chocolate. These compositions can include cocoa butter, e.g. can be formulated to contain chocolate-liquor, yet provide temperable chocolate compositions. These compositions also provide firmness control for a variety of chocolate applications. Further, these compositions can be derived from inexpensive natural fats, in particular palm oil.

The confectionery compositions of the present invention comprises a fat component having, by weight of the fat component:
  (a) at least about 70% SOS triglycerides;
  (b) from about 4 to about 20% combined SUU/UUU/SLS triglycerides;
  (c) about 8% or less SLS triglycerides;
  (d) about 9.5% or less SSO triglycerides;
  (e) about 2.5% or less SSS triglycerides; and
  (f) about 4% or less other glycerides;
wherein S is stearic (St) or palmitic (P); and U is oleic (O) or linoleic (L). The St:P weight ratio is about 0.8 or less. In addition, these compositions usually comprise a flavor component, preferably containing a chocolate flavor, to form flavored confectionery compositions.

The advantageous properties of the confectionery compositions of the present invention can be related to the unique triglyceride composition. By lowering the St:P ratio, these compositions provide a sharper mouth melt than that of chocolate formulations which contain exclusively cocoa butter as the fat. Moreover, by minimizing the level of SLS, SSO and SSS triglycerides, the compositions of the present invention are temperable even when they include cocoa butter such as that present in chocolate-liquor. Moreover, and contrary to existing belief in the cocoa butter art, it has been found that the liquid triglycerides (SUU/UUU/SLS) are the most important to firmness control of the chocolate at room temperature. By controlling these liquid triglycerides within the above indicated range, compositions can be formulated having appropriate firmness for a variety of applications where chocolate is used.

Confectionery Fat Composition

A. Fat Component

1. Definition

As used herein, the term "fat component" refers to all triglycerides, diglycerides and monoglycerides present in the confectionery composition. For example, if chocolate-liquor is used to formulate chocolate compositions according to the present invention, the cocoa butter portion is included as part of the fat component. If milk solids are used, for example, in milk chocolate compositions according to the present invention, any butter fat present is included as part of the fat component. The fat component can comprise a portion or all (100%) of the confectionery composition.

2. Key Triglycerides

The triglyceride composition of the fat component is responsible for the advantageous properties of the confectionery compositions of the present invention. The key triglycerides are the saturated-oleic-saturated (SOS), saturated-unsaturated-unsaturated (SUU), unsaturated-unsaturated-unsaturated (UUU), saturated-linoleic-saturated (SLS), saturated-saturated-oleic (SSO), and saturated-saturated-saturated (SSS) triglycerides. As used herein, S refers to the stearic (St) or palmitic (P) fatty acid residues of the glyceride molecule; U refers to the oleic (O) or linoleic (L) fatty acid residues of the glyceride molecule. The percentages of these triglycerides (by weight) in the fat component can be determined by Argentation Thin Layer chromatography (hereafter Argentation). Argentation uses silver nitrate as a complexing agent in chromatographic separation. The triglycerides separate according to the degree of unsaturation and the position of the fatty acid on the glyceride molecule. However, chain length of the saturated fatty acids cannot be determined by this method. For example, Argentation can be used to distinguish SOS, SSO and SOO triglycerides, but cannot be used to distinguish POP, POSt, and StOSt triglycerides. The specific Argentation method used to determine the triglyceride composition of the fat component of the present invention is described hereafter under the Analytical Methods section of the present application.

3. Glyceride Composition and Properties

In terms of the properties imparted to the confectionery composition, the SOS triglycerides and combined SUU/UUU/SLS triglycerides are by far the most important. The SOS triglycerides, i.e. the StOSt, POSt and POP, triglycerides, determine the mouth melt properties of the fat composition. The combined SUU/UUU/SLS triglycerides, more appropriately referred to as the "liquid" triglycerides, determine the firmness of the fat composition, and to some degree its final melting temperature. As used herein, the term "combined SUU/UUU/SLS triglycerides" refers to the total percentage of SUU, UUU and SLS triglycerides present in the fat component.

The SOS triglycerides are present in the composition at at least about 70% by weight of the fat component. For fat components where butter fat is not present, these SOS triglycerides are typically present at at least about 80% by weight, and preferably at at least 85% by weight. The combined SUU/UUU/SLS triglycerides are present at from about 4 to about 20% by weight of the fat component. For chocolate candy executions having optimum firmness and "snap", these triglycerides are preferably present at from about 8 to about 15% by weight. Usually, the SUU triglycerides comprise at least about 50% by weight, and preferably at least about 80% by weight, of the combined SUU/UUU/SLS triglycerides.

Another key aspect of the fat component of the present invention is the minimized level of SLS, SSO and SSS triglycerides. It has been determined that these triglycerides are responsible for the lack of temperability and compatibility of a fat with cocoa butter when present above certain critical levels. The maximum level of SLS triglycerides is about 8% or less by weight of the fat component. Typically, the SLS triglycerides are present in the fat component at about 5% or less by weight. The maximum level of SSO triglycerides is about 9.5% or less by weight of the fat component. Typically, the SSO triglycerides are present in the fat component at about 6% or less by weight. The maximum level of SSO triglycerides which can be tolerated varies depending upon the St:P ratio of the fat component, and the amount of butterfat (or fats having butterfat-like triglycerides) in the fat component. For example, as the St:P ratio reaches the maximum of about 0.8, the maximum level of SSO triglycerides which can be tolerated is about 6% or less by weight. Also, as the amount of butterfat reaches the maximum of about 20% by weight of the fat component, the maximum level of SSO triglycerides which can be tolerated is about 5% or less by weight. For the SSS triglycerides, the maximum level which can be tolerated is about 2.5% or less by weight, and is preferably about 2% or less by weight.

Other glycerides can be present at about 4% or less by weight of the fat component. As used herein, the term "other triglycerides" refers to SOS, SUU, UUU, SLS, SSO and SSS triglycerides wherein S is neither palmitic (P) nor stearic (St) or wherein U is neither oleic (O) nor linoleic (L). Also included in this term are the saturated-saturated-linoleic (SSL) and the unsaturated-saturated-unsaturated (USU) triglycerides, as well as the mono- and diglycerides.

Of these other glycerides, it has been found to be particularly important to minimize the level of 1,2- and 1,3-diglycerides in the fat component. This is especially true when increasing levels of butter fat are used, e.g. for milk chocolate applications. The maximum level of diglycerides should be about 2% or less by weight of the fat component. Typically, the diglycerides are present at about 1% or less by weight. The level of diglycerides can be determined by measuring the Carbon Number Profile (hereafter CNP) of the fat component if butter fat is not present. (The method for determining the CNP of the fat component is described hereafter in the Analytical Methods section of the present application. The key diglycerides based on palmitic, stearic, oleic and linoleic fatty acid residues have CNP numbers of 32, 34 or 36.). If butter fat is present, the level of diglycerides cann be determined by Argentation.

An important aspect of the fat component of the present invention is its St:P weight ratio. This ratio indirectly measures the proportion of POP, POSt and StOSt triglycerides present in the fat component. It is these triglycerides which determine the mouth melt characteristics of the composition of the present invention. The St:P ratio is about 0.8 or less, preferably about 0.5 or less, and most preferably about 0.3 or less. The St:P ratio often depends upon how much cocoa butter (St:P ratio of about 1.3) is present as either added fat or more typically from the source of (chocolate) flavor used. For those confectionery compositions where the fat component is almost exclusively a fat derived from palm oil or like fats (minimal or no levels of cocoa butter being present), the St:P ratio can be about 0.2 or less.

The weight percentages of the stearic (St), and palmitic (P), as well as the oleic (O) and linoleic (L), fatty acid residues of the various triglycerides are measured by determining the Fatty Acid Composition (hereafter FAC). The FAC for the triglycerides of the fat component of the present invention can be obtained by the method described hereafter under the Analytical Methods section of the present application.

In addition, the level of StOSt triglycerides present in the fat component is desirably minimized for improved mouth melt properties. The StOSt triglycerides have a significantly higher melting point than the POP or POSt triglycerides. As such, minimizing the level of StOSt triglycerides results in a much sharper melting mixture of SOS triglycerides at below body temperatures. These StOSt triglycerides are typically present at about 20% or less by weight of the SOS triglycerides, preferably at about 15% or less by weight, and most preferably at about 10% or less by weight. The level of StOSt triglycerides can be determined by measuring the CNP of the SOS triglyceride fraction separated by Argentation. (The CNP numbers of the POP, POSt and StOSt triglycerides are 50, 52 and 54, respectively).

The fat component usually comprises from about 30 to 100% by weight of a fat or fat blend having a low St:P ratio (about 0.2 or less), the remainder (i.e. from 0 to about 70% by weight) of the fat component typically being cocoa butter. This cocoa butter in the fat component can be either added fat or more typically is present in the source of (chocolate) flavor used in the composition. Butterfat or butter oil (e.g. from milk solids) can also be included at up to about 20% by weight of the fat component. For chocolate compositions which do not use chocolate-liquor (e.g. chocolate flavored coatings), the fat or fat blend having the low St:P ratio comprises from about 50 to 100% by weight of the fat component, the remainder (i.e., from 0 to about 50% by weight) being cocoa butter and/or butter fat.

B. Flavor Confectionery Fat Compositions

1. Amount of Fat Component

The present invention particularly relates to flavored confectionery compositions. In such flavored compositions, the fat component usually comprises from about 20 to about 45% by weight of the composition. The particular amount of the fat component which is suitable can depend on the application for which it is used. For molding applications, the fat component preferably comprises from about 29 to about 33% by weight of the composition. For some enrobing applications, the fat component preferably comprises from about 33 to about 40% by weight of the composition. For chocolate depositing applications (e.g. chocolate chips), the fat component preferably comprises from about 25 to about 32% by weight of the composition.

2. Flavor Component

In addition to the fat component, these flavored compositions comprise a flavor enhancing amount of a flavor component. The flavor component comprises flavor constituents which impart positive flavor characteristics, and optionally nonflavor constituents normally present in flavor compositions, e.g. flavor carriers. As used herein, the term "flavor enhancing amount" refers to an amount of the flavor component sufficient to impart positive flavor characteristics to the composition. As such, the amount of the flavor component sufficient to be "flavor enhancing" can depend on the flavor source used, the flavor effects desired and like factors. Typically, the flavor component (nonfat constituents) comprises from about 0.1 to about 30% by weight of the composition.

A variety of flavor sources can be used to form the flavor component. A particularly preferred flavor source is a chocolate flavor. Suitable chocolate flavors can be derived from chocolate-liquor, or cocoa powder. These chocolate materials (fat plus nonfat ingredients) are typically included at from about 10 to about 40% by weight of the composition. As used herein, "chocolate-liquor" refers to the solid or semi-plastic food prepared by finely grinding cacao nibs. Chocolate-liquor usually contains from about 50 to about 58% by weight cocoa butter fat. As used herein, "cocoa powder" refers to the residual material remaining after part of the coaoa butter fat has been removed from ground cacao nibs. Cocoa powder usually contains from about 10 to about 22% by weight cocoa butter fat. (As previously stated, this cocoa butter fat present in chocolate-liquor and cocoa powder is included as part of the fat component.) Other sources of flavor include vanillin, ethyl vanillin, spices, coffee, brown sugar, etc., as well as mixtures of these flavors.

3. Sugar and Sugar Alcohols

For flavored confectionery compositions of the present invention, one particularly important ingredient is sugar. Sugar is typically present in such compositions at from about 40 to about 60% by weight of the composition. Especially for compositions used to make chocolate, the source of sugar needs to be essentially dry. Sources of sugar include sucrose, fructose, glucose and mixtures thereof. The sugar usually has a maximum particle size of from about 0.0004 to about 0.0016 inches (from about 10 to about 40 microns) in finished chocolate products.

For diet compositions, in particular die chocolate, the sugar can be completely or partially substituted with a sugar alcohol. Suitable sugar alcohols include sorbitol, xylitol, mannitol and mixtures thereof.

4. Milk Solids

Especially in milk chocolate applications, the composition of the present invention can also include milk solids (essentially dry), usually at from about 12 to about 20% by weight of the composition, and typically at from about 14 to about 18% by weight. Suitable sources of essentially dry milk solids can be obtained from cream, milk, concentrated milk, sweetened condensed milk, skim milk, sweetened condensed skim milk, concentrated buttermilk, and the like. (As previously stated, any fat present in the milk solids, such as butterfat, is included as part of the fat component.)

5. Other Ingredients

Flavored confectionery compositions usually include an emulsifier to "wet" the sugar particles with the fat. Suitable emulsifiers include sorbitan monostearate, polysorbate 60, and particularly lecithin. These emulsifiers are usually present at up to about 1.5% by weight of the composition, and typically at up to about 0.5% by weight. Preferred levels of emulsifier are from about 0.3 to about 0.5% by weight. Other minor ingredients such as salt normally present in fat based confections can also be included.

D. Analytical Methods

1. Argentation

The positional isomer triglyceride composition of a fat can be determined by Argentation Thin Layer Chromatography. 20 cm. square, 250 micron layer thickness, silica gel G plates (Analtech, Newark, Del.) are used. The plates are prewashed for 2.5 to 3 hrs. by ascending treatment with chloroform/methanol (140 ml/70 ml) and air-dried. The plates are then sprayed with 2.5% aqueous solution of silver nitrate until evenly wet and activated in a forced-air oven (115° C.) for 60 min. After being cooled, the plates are used immediately or stored in a dust-free container and used within 24 hours.

The activated plate is prewashed by ascending development with hexane/ethyl ether/acetic acid (180 ml/20 ml/0.5 ml) for 30 to 40 min., air-dried and scored into 18 lanes 1 cm wide. A line is drawn across the top edge of the plate 2.5 cm from the top. For sample development, 50 ml. of water is poured into a metal development chamber and allowed to equilibrate while preparation of the sample is performed. The chamber is covered with saran wrap and a glass lid. The developing solvent, methylene chloride/toluene/acetic acid (28 ml/5 ml/0.05 ml), is prepared and stored in a glass-stopped, graduated cylinder.

A single sample is analyzed on each plate and the isomer composition is calculated by relative distribution. The sample is melted in a hot water bath, mixed and 400 mg. weighed into a 10 ml. volumetric flask. The dilution solvent, 1% acetic acid in chloroform, is added to the mark. Six dilutions are made from the original solution: (1) 2 ml diluted to 5 ml with 1% acetic acid in chloroform, (2) 2 ml diluted to 10 ml, (3) 1 ml diluted to 10 ml, (4) 0.5 ml diluted to 10 ml, (5) 0.25 ml diluted to 10 ml, and (6) 0.25 ml diluted to 25 ml. Aliquots are spotted on alternate lanes, leaving blank lanes for double beam densitometer scanning. Five microliter aliquots are spotted 2.5 cm from the bottom edge of the plate as follows: dilution (1) on lane 1; dilution (2) on lane 7; dilution (3) on 9; dilution (4) on lane 11; dilution (5) on lanes 3 and 13; dilution (6) on lanes 5 and 15; and the original solution on lane 17. A standard solution containing a mixture of isomers (2 microg. each of tristearin, oleo-distearin, dioleopalmitin, 2-oleo-1,3-distearin, and 3-oleo-1,2-distearin) is spotted on lane 18. Lane 18 is used for reference and for determining the charring response for 2 microg. when scanning. (Densitometer readings are most accurate between 1 to 2 microg. of charred sample spot.)

Immediately after spotting the plate, the prepared development solvent is poured into a small metal tray placed in the bottom of the development chamber containing the water. The plate is set into the solvent tray and the cover replaced on the chamber. When the solvent reaches the upper line (30 to 40 min.), the plate is removed and air-dried for a few minutes. The dried plate is then sprayed with 20 ml. of 25% aqueous sulfuric acid and placed on a pre-heated (250°-260° C.) hot plate (Thermolyne Model 1P-A2245-M, 1 cm×33 cm×15 cm high) covered with ceramic cloth. After 15 to 20 min. charring, the plate is removed and allowed to cool.

The charred plate is then scanned at a wave length of 546 nm with a Schoeffel densitometer (Model SD with SDC300 density computer) using the ratio mode. A Varian CDS 111C is used for integration. The individual isomer count value nearest to the 2 microg. count value on lane 18 is used for calculation. The response factor is assumed to be nearly identical for all isomers in this range. Averages of 2 lanes or more may be used depending on integration counts. Either single lane counts or averge counts are used for totals, whichever is applicable. After proper identification and selection of all the isomers in the sample, the counts from the appropriate lane(s) are converted to the same basis. The conversion factors are: lane 1=40; lane 7=20; lane 9=10; lane 11=5; lanes 3 and 11=2.5; lanes 5 and 15=1; and lane 18=100. The converted counts are summed and normalized, yielding the relative distribution of the isomers in the fat sample.

2. Carbon Number Profile (CNP)

The CNP of a particular triglyceride composition can be determined by programmed temperature-gas chromatography using a short fused silica capillary column coated with methyl silicone for analysis and characterization of the composition by molecular weight. The glycerides are separated according to their respective carbon numbers, wherein the carbon number defines the total number of carbon atoms on the combined fatty acid residues. The carbon atoms on the glycerol molecule are not counted. For example, the POP, POSt and StOSt triglycerides would have carbon numbers of 50, 52 and 54, respectively. Glycerides with the same carbon number will elute as the same peak. For example, a triglyceride composed of three C16 (palmitic) fatty acid residues will co-elute with triglycerides made up of one C14 (myristic), one C16 and one C18 (stearic) fatty acid residue or with a triglyceride composed of two C14 fatty acid residues and one C20 (arachidic) fatty acid residue.

Preparation of the fat sample for analysis is as follows: 1.0 ml. of a tricaprin internal standard solution (2 mg./ml. of methylene chloride) is pipetted into a vial. The methylene chloride solvent is evaporated using a steam bath under a nitrogen stream. Two drops of the fat sample (20 to 40 mg.) are pipetted into the vial. If the fat sample is solid, it is melted on a steam bath and stirred well to insure a representative sample. 1.0 ml. of bis(trimethylsilyltrifluoroacetamide) (BSTFA) is pipetted into the vial which is then capped. The contents of the vial are shaken vigorously and then placed in a heating block (temperature of 100° C.) for about 5 minutes.

For determining the CNP of the prepared fat sample, a Hewlett-Packard 5880A series gas chromatograph equipped with temperature programming, a flame ionization detector and a 2 m. long, 0.22 mm. diameter fused silica capillary column coated with a thin layer of methyl silicone (Chrompak CP-SIL 5) is used. The following instrument conditions are used with the gas chromatograph:

| Temperature program | |
|---|---|
| initial temp. | 165° C. |
| initial time | 0.5 min. |
| program rate | 25° C./min. |
| final temp. | 355° C. |
| final time | 5.0 min. |
| Detector Temp. | 365° C. |
| Injector Port Temp. | 365° C. |
| Septum Purge | 1 ml/min. |
| Inlet Pressure | 5 psi |
| Injection Volume | 1 microl. |
| Carrier Gas | helium |
| Split Vent Flow | 75 ml/min. |

The chromatographic peaks generated are then identified and the peak areas measured. Peak identification is accomplished by comparison of retention time of unknown peaks to those of pure glyceride standards previously programmed into the data system. The peak area as determined by the data system, along with the corresponding response factors ($R_f$), are used to calculate the percentage of glycerides having a particular Carbon Number ($C_N$) according to the following equation:

$$\%C_N = (\text{Area of } C_N \times R_f / S) \times 100$$

wherein S=sum of (Area of $C_N \times R_f$) for all peaks generated.

Response factors ($R_f$) are determined by comparing the actual responses of a mixture of pure glycerides of various Carbon Numbers (below) to the known amounts of each glyceride in the mixture. A glyceride generating an actual response greater than its actual amount has a response factor less than 1.0; likewise, a glyceride generating a response less than that of its actual amount has a response factor of greater than 1.0. A typical mixture of standard glycerides used (in a methylene chloride solution) to generate response factors is as follows:

| Component | Carbon No. | Amount (mg./ml.) |
|---|---|---|
| palmitic acid | 16 | 0.5 |
| monopalmitin | 16 | 0.5 |
| monostearin | 18 | 0.5 |
| dipalmitin | 32 | 0.5 |
| palmitostearin | 34 | 0.5 |
| distearin | 36 | 0.5 |
| tripalmitin | 48 | 1.5 |
| dipalmitostearin | 50 | 1.5 |
| distearopalmitin | 52 | 1.5 |
| tristearin | 54 | 1.5 |

3. Fatty Acid Composition (FAC)

The FAC of a particular triglyceride composition can be determined by gas chromatographic analysis performed on the corresponding methyl ester mixtures. The fatty acid residues attached to the glycerides are converted to the respective methyl esters and injected directly into the gas chromatographed where the components are separated by chain length and degree of unsaturation. The peak areas for each methyl ester can be determined either graphically or electronically.

Prior to gas chromatographed analysis of the fat sample, the fatty acid residues attached to the glyceride are converted to the respective methyl esters as follows: Fifty ml. of sodium methoxide reagent (3 g. of sodium per l. of methanol) is added to 10-15 g. of the fat sample. This mixture is boiled with stirring for 3-5 minutes. After boiling, 25 ml. of saturated NaCl—0.5% HCl solution is added to the mixture. After addition of the NaCl—HCl solution, 50 ml. of hexane is added. The mixture is then shaken and the hexane layer (top) decanted through filter paper containing about 5 g. of anhydrous sodium sulfate. A sample is taken from the filtered hexane layer for analysis of the methyl esters. The hexane is then evaporated from the sample.

To determine the FAC of the prepared fat sample, a Hewlett-Packard 5880 series gas chromatograph equipped with temperature programming, thermal conductivity detector and a 10 ft. long, ¼ inch diameter stainless steel column packed with a preconditioned packing of 10% DEGS-PS on 100/120 mesh Chromosorb WHP is used.

The following instrument conditions are used with the gas chromatograph:

| Detector | 300° C. |
|---|---|
| Carrier Gas | helium |

| | |
|---|---|
| Carrier Gas Flow | 60 ml./min. |
| Injector Temp. | 300° C. |
| Injection Volume | 1 microl. |
| Column Temperature | 215° C. |

The chromatographic peaks generated are then identified and the peak areas measured. Peak identification is accomplished by comparison to known pure methyl esters previously programmed into the data system. The peak area as determined by the data system is used to determine the percentage of the particular fatty acid (FA) according to the following equation:

$$\% \, FA = (\text{Area of } FA \times \sqrt{\text{Molecular Weight of } FA} \, /S) \times 100$$

wherein $S$ = sum of (Area of $FA \times \sqrt{\text{Molecular Weight of } FA}$ ) of all peaks generated Method for Making Low St:P Ratio Fat Other than cocoa butter, or butter fat, the fat component usually consists entirely of a fat having a low St:P ratio (about 0.2 or less). This low St:P ratio fat can be made by first preparing a fat high in SOS, and especially POP, triglycerides. To increase the level of liquid triglycerides, this POP fat can be blended with a fat high in SUU/UUU/SLS, and especially POO, triglycerides. The amount of the POP and SUU/UUU/SLS fat blended together can be varied so as to achieve the desired triglyceride composition for the fat component. Typically, the POP fat comprises from about 80 to 100% by weight of the fat blend, while the SUU/UUU/SLS fat comprises from 0 to about 20% by weight of the fat blend.

A preferred source of POP fat is derived from palm oil by a triple stage solvent fractionation process disclosed in U.S. application Ser. No. 684,514 to Joseph S. Baker and Rose M. Weitzel, filed Dec. 21, 1984. As used herein, "palm oil" refers to unfractionated whole palm oil or partially fractionated palm oil. As used herein, "solvent fractionation" refers to the steps of providing a fat dissolved or melted in a suitable solvent (hereafter defined), crystallizing fat crystals from the solvent and then separating the fat crystals (stearine fraction) from the solvent phase which contains the olein (liquid) fraction. In the first stage of this process, most of the liquid SUU/UUU/SLS triglycerides are removed. Initially, palm oil is melted in a suitable solvent. One or more olein fractions are then removed from the melted palm oil by solvent fractionation to provide a stearine fraction. The stearine fraction contains less than about 10% (preferably less than about 5%) by weight SUU/UUU/SLS (POO) triglycerides. The olefin fraction(s) obtained during this first stage contain predominantly the SUU/UUU/SLS triglycerides and are useful as hereafter described.

The second fractionation stage of this process primarily involves removal of the SSO triglycerides. The stearine fraction from the first stage is melted in a suitable solvent and then one or more olefin fractions are removed by solvent fractionation to provide another stearing fraction. The stearine fraction from the second stage contains less than about 8% (preferably less than about 5%) by weight SSO triglycerides.

The third fractionation stage primarily involves removal of the SSS triglycerides. The stearine fraction from the second stage is melted in a suitable solvent and then a stearine fraction is removed therefrom. This stearine fraction from the third stage contains most of the SSS triglycerides originally present in the palm oil. The olein fraction obtained in this third stage provides the POP fat which has less than about 2.5% by weight SSS triglycerides.

Suitable solvents for use in this triple stage fractionation process include hexane, hexane/$C_1$-$C_3$ alcohol mixtures (e.g. hexane/isopropyl alcohol), and especially acetone. The particular temperatures used for crystallization and separation of the stearine fractions from the olefin fractions and the weight ratios of solvent to fat used for the solvent fractionations performed in the various stages of this process can vary, especially depending on the solvent used. Also, it is frequently desirable to perform several solvent fractionations in one or more of the three fractionation stages in order to effect better separation and removal of the SSU/UUU/SLS, SSO and SSS triglycerides, without significant loss of the key SOS triglycerides.

A preferred embodiment of this three stage fractionation process using acetone as the solvent is as follows: The first stage involves two solvent fractionations. In the first fractionation, refined, bleached, deodorized (RBD) whole palm oil having a low peroxide content is mixed with acetone at a weight ratio of acetone:palm oil of from about 3:1 to about 7:1, and preferably from about 4:1 to about 6:1. The acetone:palm oil mixture is heated to a temperature above about 32° C. to melt the palm oil. This melted mixture is then slowly cooled with gentle agitation in a batch crystallizer at a rate of from about 0.1° to about 0.6° C./min. to cause formation of fat crystals. Cooling needs to be carefully controlled to prevent the formation of extremely fine crystals which turn the mixture into a thick, creamy, pudding-like mass. Such a pudding-like mass is difficult to remove from the crystallizer; subsequent separation of the fat crystals from the solvent phase is also extremely difficult. The Cloud Point of the mixture typically occurs at about 22° to about 23° C. with heavy crystallization typically occurring at about 6° C. After heavy crystallization is complete (about 15-20 minutes after it starts), the fat crystal/solvent mixture is lowered to a final fractionation temperature of from about −6° to about 7° C. (preferably from about 1° to about 3° C.) and then held at this temperature for about 0.5 to about 2 hours. The solvent phase containing the olein fraction is then filtered from the fat crystals (stearine fraction) using techniques well known in the art, e.g. Buchner funnel, vacuum drum filter.

In the second fractionation, this first stearine fraction is mixed with acetone at a weight ratio of acetone:fat of from about 4:1 to about 7:1 and preferably from about 4:1 to about 6:1. This acetone:fat mixture is heated to a temperature above about 40° C. (typically from about 40° to about 42° C.) to melt the fat. This melted mixture is then slowly cooled with gentle agitation at a rate of from about 0.1° to about 0.6° C./min. in a batch crystallizer to cause crystallization of fat crystals. The Cloud Point of this mixture typically occurs at about 25° to about 32° C. with heavy crystallization typically occurring at about 11° to about 12° C. After heavy crystallization is complete, the fat crystal/solvent mixture is lowered to a final fractionation temperature of from about 4° C. to about 7° C. and then held at this temperature for about 0.5 to about 2 hours. The solvent phase containing a second olefin fraction is then filtered from the fat crystals (second stearine fraction) by art-recognized techniques.

The second stage of this preferred process also involves two solvent fractionations. In the first fractionation, the second stearing fraction is mixed with acetone at a weight ratio of acetone:fat of from about 5:1 to about 8:1, and preferably from about 6:1 to about 7:1. The acetone:fat fraction mixture is heated to a temperature above about 40° C. (typically from about 40° to about 42° C.) to melt the fat. This melted mixture is then slowly cooled with gentle agitation in a batch crystallizer at a rate of from about 0.1% to about 0.7° C./min. to cause crystallization of the fat crystals. The Cloud Point of the mixture typically occurs at about 27° to about 32° C. with heavy crystallization typically occurring at about 11° to about 12° C. After heavy crystallization is complete, the fat crystal/solvent mixture is lowered to a final fractionation temperature of from about 0° to about 7° C. (typically from about 4° to about 7° C.) and held at this temperature for about 0.5 to about 2 hours. The solvent phase containing the olefin fraction is then filtered from the fat crystals (third stearine fraction) by art-recognized techniques. In the second fractionation, the third stearine fraction is solvent fractionated using the same processing conditions as the first fractionation in the second stage to provide a fourth stearine fraction.

In the third stage, the fourth stearine fraction is mixed with acetone at a weight ratio of acetone:fat of from about 3:1 to about 6:1, and preferably from about 4:1 to about 5:1. The acetone:fat mixture is heated to a temperature above about 40° C. (typically about 40° to about 42° C.) to melt the fat. This melted mixture is then slowly cooled with gentle agitation in a batch crystallizer at a rate of from about 0.2° to about 0.8° C./min. to cause crystallization of fat crystals (fifth stearine fraction). The Cloud Point of this mixture typically occurs at about 30° to 32° C. with gradual crystallization occurring from the Cloud Point temperature to about 21° to about 22° C. The fat crystal/solvent mixture is held at this temperature for about 0.5 to about 2 hours. The the fifth stearine fraction is then filtered away from the solvent phase containing the olein fraction by art-recognized techniques. The solvent is then evaporated from the olein fraction to yield the POP fat.

One such POP fat derived from palm oil using acetone as the solvent in this preferred triple stage fractionation process is described as follows:

A 1260 g. portion of refined, bleached, deodorized (RBD) whole palm oil was charged into an 8 l. capacity batch crystallizer with 5040 g. of dry acetone (acetone:palm oil weight ratio of 4:1). The mixture was warmed to about 36° C. to melt the RBD palm oil. This mixture was then cooled at a rate of 0.2° C./min. using a Lauda/Brinkman circulating bath in conjunction with a Neslab U-Cool. The Cloud Point of the mixture was observed at about 23° C. Heavy crystallization occurred at 6.2° C. after about 10 minutes at that temperature. The temperature of the mixture was then lowered to 6.1° C. (total elapsed time to this point of about 3 hours) and then held at 5.7° to 6.1° C. for about 30 minutes. The mixture was then lowered to a temperature of 2.1° C. and held at 2.1° to 2.7° C. for about 30 minutes. The fat crystals were filtered with a Buchner funnel (precooled to 0° C.) and then washed with about 1000 ml. of cold acetone (temperature 1.7° C.). These crystals were then air-dried to yield 490.7 g. of a stearine fraction (S-1A). The filtrate and wash was evaporated to yield 729.2 g. of an olefin fraction (O-1A).

A 486.7 g. portion of the S-1A stearine fraction and 2000 g. of acetone were charged into the crystallizer (acetone:fat weight ratio of 4:1) and warmed to about 41° C. to melt the stearine fat crystals. The temperature of this mixture was then cooled slowly (rate of 0.2° C./min.) with the Cloud Point occurring at about 25° C. Heavy crystallization occurred at about 12° C. (total elapsed time to this point of about 2.5 hours). The temperature was then lowered to 6.1° C. and held at 4.5° to 6.1° C. for one hour. The fat crystals were filtered from the solvent phase with a precooled Buchner funnel and washed with 1000 ml. of cold acetone. These fat crystals were air-dried to yield 366.8 g. of a stearine fraction (S-1B). The solvent present in the filtrate and wash was evaporated to yield 141.6 g. of a olein fraction (O-1B).

A 361.2 g. portion of the S-1B stearine fraction and about 2200 g. of acetone (acetone:fat weight ratio of 6:1) was charged to the crystallizer and then warmed to approximately 45° C. to melt the stearine fat crystals. The temperature of this mixture was then cooled slowly (rate of 0.2° C./min.) with the Cloud Point occurring at about 27° C. Heavy crystallization occurred at about 11.8° C. (total elapsed time to this point of about 2 hours). The temperature of the mixture was then lowered to 6.1° C. and held at 4.4° to 6.0° C. for one hour. The fat crystals were filtered from the solvent phase with a precooled Buchner funnel and washed with about 1000 ml. of cold acetone. The fat crystals were air-dried to yield 327.6 g. of a stearine fraction (S-2A). The solvent in the filtrate and wash was evaporated to yield 32.6 g. of an olein fraction (O-2A).

A 322.0 g. portion of the S-2A stearine fraction was charged with 1930 g. of acetone (acetone:fat weight ratio of 6:1) to the crystallizer and the mixture then warmed to about 42° C. to melt the stearine fat crystals. This mixture was then cooled slowly (rate of 0.3° C./min.) with the Cloud Point being observed at about 28° C. Heavy crystallization occurred at about 12° C. (total elapsed time to this point of about 2 hours). The temperature of the mixture was then lowered to 6.1° C. and held at 4.5° to 6.0° C. for one hour. The fat crystals were filtered from the solvent phase with a precooled Buchner funnel and then washed with about 1000 ml. of cold acetone. The fat crystals were then air-dried to yield 302.4 g. of a stearine fraction (S-2B). The solvent present in the filtrate and wash was evaporated to yield 18.2 g. of an olein fraction (O-2B).

A 296.7 g. portion of the S-2B stearine fraction was charged to the crystallizer with 1200 g. of acetone (acetone:fat weight ratio of 4:1). This mixture was warmed to about 41° C. to melt the stearine crystals. This mixture was then cooled (rate of 0.3° C./min) with the Cloud Point being observed at about 30° C. The temperature of the mixture was then lowered to 22.2° C. and held at 21.8° to 22.0° C. for one hour. The fat crystals were filtered from the solvent phase with a Buchner funnel and then air-dried to yield 122.1 g. of a third stearine fraction (S-3). The solvent present in the filtrate was evaporated to yield 173.4 g. of the desired POP fat (O-3).

The triglyceride composition of the various stearine and olein fractions, as measured by Argentation, are presented in the following table:

| Fraction | Glycerides (%) | | | |
|---|---|---|---|---|
| | SSS | SOS | SSO | SOO/OOO/SLS/other |
| RBD palm oil | 4.2 | 31.2 | 4.2 | 55.4 |
| S-1A | 9.9 | 65.9 | 5.8 | 16.9 |
| O-1A | 0.0 | 7.3 | 3.6 | 78.3 |
| S-1B | 19.6 | 59.7 | 5.9 | 14.8 |
| O-1B | 0.1 | 18.3 | 8.9 | 72.7 |
| S-2A | 21.4 | 71.4 | 5.4 | 1.8 |
| O-2A | 0.0 | 45.5 | 13.6 | 38.6 |
| S-2B | 22.0 | 73.4 | 3.7 | 0.9 |
| O-2B | 0.0 | 46.9 | 31.2 | 21.9 |
| S-3 | 58.3 | 38.8 | 2.9 | 0.0 |
| O-3 | 1.8 | 91.7 | 4.6 | 1.8 |

A preferred embodiment of this three stage fractionation process involving an isopropanol:hexane mixture (3:1 weight ratio) as the solvent is as follows: whole RBD palm oil is mixed with the solvent at a solvent::palm oil ratio of about 4:1 to about 6:1. This mixture is then heated to a temperature of from about 31° to about 32° C. to melt the palm oil. This melted mixture is then slowly cooled at a rate of from 0.1° to 0.7° C./min. in a batch crystallizer to cause crystallization of the fat crystals. The Cloud Point typically occurs at about 24° C. with heavy crystallization typically occurring at about 4° C. After heavy crystallization, the fat crystal/solvent mixture is then lowered to a final fractionation temperature of from about −1° to about −2° C. and then held at this temperature for about 0.5 to about 2 hours. The solvent phase is then filtered away to yield a first stearine fraction.

This first stearine fraction is then solvent fractionated five times (fractionations 2 to 4 remove SUU/UU-U/SLS triglycerides, fractionations 5 and 6 remove SSO triglycerides) to finally yield a sixth stearine fraction using the following fractionation conditions:

| Fractionation | Solvent:fat ratio | Final Fractionation Temp (°C.) |
|---|---|---|
| 2 | 4:1 | −1 to 0 |
| 3 | 6:1 | 0 |
| 4 | 8:1 | 2 |
| 5 | 8:1 | 5 |
| 6 | 10:1 | 5 |

In these fractionations, the mixture of solvent and fat is melted at a temperature above about 36° C. (typically about 36° to about 39° C.). The Cloud Point is typically reached at a temperature of from 25° to 27° C. with heavy crystallization typically occurring at a temperature of from 7° to 8° C. The rate of cooling is from 0.1° C. to 0.2° C./min.

This sixth stearine fraction is then mixed with the solvent at a solvent:fat ratio of from about 6:1 to about 8:1. This solvent:fat mixture is then heated to a temperature above about 39° C. to melt the fat. This melted mixture is then slowly cooled with gentle agitation at a rate of from 0.1° to 0.3° C./min. The Cloud Point of the mixture is typically reached at about 28° C. Crystallization is gradual as the solvent:fat mixture is lowered to a final fractionation temperature of about 21° C. and held at this temperature for about 0.5 to about 2 hours. A seventh stearine fraction (SSS triglycerides) is filtered away from the solvent phase containing the desired POP fat. The POP fat is then obtained by evaporating the solvent.

The previously described embodiments for fractioning palm oil involve batch crystallizations. Suitable POP fats can also be obtained by continuous fractionation of palm oil. This continuous process permits greater processing speeds, i.e. increases throughput. Also, this continuous process provides better control of fat crystal size and filterability of the fat crystals from the solvent.

In this continuous process, one or more scraped surface heat exchangers (SSHE) are used instead of a batch crystallizer. Each SSHE has a small diameter shaft to which are attached scrapers for removing solids from the interior surface of the SSHE. The shaft typically rotates at a relatively slow speed (e.g. from 15 to 30 rpm).

The melted fat in the solvent is precooled to just above the Cloud Point and is then fed into the first SSHE which is cooled by circulating a coolant (e.g. ethylene glycol) at the appropriate temperature through the jacket. Fat crystals (stearine fraction) are formed; any fat crystals which form on the cooled interior surface of the SSHE are scraped off. The solvent containing the crystallized fat from the first SSHE is then fed to the remaining SSHEs. The remaining SSHEs are cooled to lower temperatures than the first SSHE. Additional crystallization of the fat occurs in these other SSHEs.

When the solvent:fat crystal mixture exists the final SSHE, it is then filtered by a rotary drum pressure filter. This filter has a housing and a concentric filtering drum which rotates within the housing. The housing is divided into several chambers which permit various operations (e.g. filtering, washing, removing residual olein) to be performed as the drum is rotated. The drum has a plurality of filter cells formed in the periphery. At the base of each filter cell is a fabric filter medium.

The solvent:fat crystal mixture is fed into one of the chambers in the housing. The solvent containing the olein fraction is filtered away by the filter medium, leaving the fat crystals (stearine fraction) behind in the filter cell. When the drum is rotated to the next chamber this wet stearine fraction is washed with fresh solvent. When the drum is rotated to the next chamber, residual olein adhering to the washed stearine fraction is removed by blowing in nitrogen. The drum is then rotated to the final chamber where the stearine fraction (as a cake) is ejected from the filter cake. The SSHEs and the rotary filter are used in each fractionation stage. In the third fractionation state, the olein fraction is filtered from the stearine fraction and then the solvent is evaporated to yield the desired POP fat.

An embodiment of this continuous process is described as follows:

Whole RBD palm oil is fractionated using acetone as the solvent. The following fractionation conditions are used:

| Fractionation | Acetone:Fat Ratios | Fractionation Temp. (°C.) | Fraction Retained |
|---|---|---|---|
| 1 | 4:1 | 2 | Stearine |
| 2 | 4:1 | 6 | Stearine |
| 3 | 6:1 | 4 | Stearine |
| 4 | 6:1 | 4 | Stearine |
| 5 | 4:1 | 21 | Olein |

During each factionation, an Armstrong continuous crystallizer is used. This crystallizer comprises two SSHEs hooked up in series. Each SSHE is 15 ft. (4.6 m.) long, has a net volume of 2.7 ft.$^3$ (0.08 m.$^3$) and has a rotating shaft to which is attached phenolic scraper blades by leaf springs. The flow rate through the crystallizer is 288 lbs. (31 kg.) per hour, giving a nominal residence time of 57 minutes through the entire crystallizer, i.e. both SSHEs.

The acetone:fat crystal mixture is then pumped to a BHS Fest Rotary Pressure Filter to separate the fat crystals (stearine fraction) from the solvent (olein fraction). This Fest filter is set up to provide the following operations: (1) a filtering section; (2) a cake (stearine fraction) washing section using precooled fresh acetone; (3) a nitrogen blowing section to remove residual olein from the cake; (4) a cake removal section where the dry cake is discharged from the filter cell; and (5) a filter wash section where the filtering medium is washed with acetone as necessary. In fractionations 1–2 (first stage) and 3–4 (second stage), the cake is retained for further processing. In fractionation 5 (third state), the filtrate from operation (1) is retained and the acetone then evaporated to yield the desired POP fat.

The POP fat can also be derived from palm oil by a less preferred modification of this three stage solvent fractionation process. In this modification, the first stage is essentially the same. However, in the second stage, a stearine fraction is removed to provide an olein fraction that contains about 2% by weight SSS triglycerides. In the third stage, this olein fraction from the second stage is solvent fractionated to remove one or more olein fractions to provide a stearine fraction having less than about 9% by weight SSO triglycerides. This stearine fraction from the third stage provides the POP fat. When acetone is used as the solvent, the processing conditions used in this modified process during solvent fractionations in the first and second stages are similar to those used in the first and third stages of the unmodifid process. However, the processing conditions for the solvent fractionations during the third stage are as follows:

| Solvent:Fat Ratio | Melting Temp. °C. | Cooling Rate (°C./min) | Cloud Point (°C.) |
|---|---|---|---|
| 4:1 to 6:1 | above 22 | 0.2 to 0.3 | about 15 |

| Heavy Cryst. Temp. (°C.) | Final Frac. Temp. (°C.) | Hold Time (hrs) |
|---|---|---|
| 10 to 11 | 4 to 4.5 | 1 |

The POP fat can also be obtained from other naturally occurring fats having high levels of SOS (POP) triglycerides, in particular the seed coat fat from the Chinese tallow tree (hereafter Chinese tallow fat). Chinese tallow fat contains relatively high levels of POP triglycerides, typically from about 75 to about 80% of such triglycerides. However, Chinese tallow fat also contains a rather high level of undesirable SSS triglycerides, typically on the order of from about 13 to about 14% of such triglycerides. In order to obtain a fat high in POP triglycerides, but with minimal levels of SSS triglycerides, this Chinese tallow fat is subjected to the third stage of the previously described unmodified palm oil fractionation process in order to remove the undesired SSS triglycerides.

One such POP fat obtained from Chinese tallow fat using the third stage of the unmodified palm oil fractionation process is described as follows:

Chinese tallow fat was extracted from about 3000 g of seed by four successive 30 min. treatments with one gallon of hexane at 51.7° C. After evaporation of the solvent, the crude fat was refined, bleached and deodorized (RBD). The RBD fat was then dissolved in acetone at a weight ratio of acetone:fat of 4:1 and at a temperature of 43.3° C. This mixture was then cooled to 28° C. (Cloud Point) and held at that temperature for 30 min. This mixture was then cooled slowly (0.2° C./min.) to 22.2° C. and held at that temperature for 1.5 hours to crystallize out fat crystals. After the fat crystals were filtered off, the solvent was evaporated to provide the desired POP fat (71% yield by weight). This POP fat had an St:P ratio of 0.02 and 90% SOS triglycerides, 1% SSS triglycerides and 9% SUU/UUU/SLS/other triglycerides.

The POP fat can also be derived synthetically. In particular, 1,3-dipalmitin can be esterified with oleic anhydride using an esterification catalyst to obtain relatively pure, POP fats. See Example 2 of U.S. Pat. No. RE. 28,737 to Yetter, reissued Mar. 16, 1976 (esterfication of 1,3-dipalmitin with oleic anhydride to obtain a POP fat containing 90–95% oleic acid at the 2-position); Example 2 of U.S. Pat. No. 3,410,881 to Martin et al., issued Nov. 12, 1968 (esterification of 1,3-dipalmitin with oleic anhydride using perchloric acid as the catalyst to obtain a POP fat containing 92% oleic acid at the 2-position); and Example 4 of U.S. Pat. No. 3,989,728 to Martin, issued Nov. 2, 1976 (esterification of 1,3-dipalmitin with oleic anhydride using ferric chloride as the catalyst to obtain a POP fat containing 90–95% oleic acid at the 2-position). All of the foregoing patents on esterification of 1,3-dipalmitin by oleic anhydride are herein incorporated by reference.

The liquid SUU/UUU/SLS triglyceride portion of the low St:P ratio fat can be obtained from various sources, including SUU/UUU/SLS triglycerides produced synthetically. Such liquid triglycerides are typically derived from naturally occurring oils. Suitable oils high in such liquid triglycerides include cottonseed oil, soybean oil, sunflower oil, corn oil, peanut oil, safflower oil, and the like. These liquid triglycerides are preferably derived from the olein fraction(s) obtained in the first stage of the previously described triple stage fractionation process of palm oil. These olein fractions can be used as is, or are preferably fractionated to obtain a higher percentage of the more desirable POO triglycerides. In addition to providing liquid triglycerides, these olefin fractions also contain desirable antioxidant tocopherols and trienols.

Chocolate Making

The flavored confectionery compositions of the present invention are particularly suitable for making chocolate. Some typical formulations for making milk chocolate, sweet dark chocolate, and chocolate coatings are as follows:

| Ingredient | Milk Chocolate % | (% Fat)** | Sweet Dark Chocolate % | (% Fat)** | Chocolate Coating % | (% Fat)** |
|---|---|---|---|---|---|---|
| Sugar | 48 | — | 48 | — | 48 | — |
| Chocolate Liquor | 14 | (7) | 38 | (19) | — | — |
| Cocoa Powder | — | — | — | — | 12 | (1.5) |
| Milk Solids | 18 | (5) | — | — | 0–10 | (0–2) |
| Added Fat* | 20 | (20) | 14 | (14) | 30 | (30) |
| Lecithin | 0.3–0.5 | | 0.3–0.5 | | 0.3–0.5 | |
| Salt & | As desired | | As desired | | As desired | |

| | Milk Chocolate | | Sweet Dark Chocolate | | Chocolate Coating | |
|---|---|---|---|---|---|---|
| Ingredient | % | (% Fat)** | % | (% Fat)** | % | (% Fat)** |
| Flavors | | | | | | |

*Low St:P ratio fat
**Approximate based on total formulation

The total fat present in the chocolate formulation can be adjusted to provide the desired viscosity. For molding, the total fat can preferably be in the range of from about 29 to about 33% by weight of the formulation; for enrobing, the total fat is preferably in the range of from about 33 to about 40% by weight. The ratios of sugar, chocolate liquor (or cocoa powder), and milk solids can vary depending upon the flavor desired.

The flavored confectionary compositions of the present invention can be made into chocolate by standard techniques for making chocolate. The initial step in chocolate making involves mixing the ingredients to "wet" them with the added fat and to provide a consistency suitable for the subsequent refining step. During this mixing step, sugar, milk solids, salts, any cocoa powder and ¼ to ⅓ of the total lecithin are added to a mixer. Then, the melted chocolate-liquor (if any) and a portion of the added fat, typically so as to provide about 22-23% total fat in the formulation, are added to the mixer. These ingredients are stirred for a period of time sufficient to "wet" the dry ingredients with the fat. The particular time period is not critical and is typically about 15 minutes. During this mixing step, the contents of the mixer are heated to a temperature of about 120° F. (49° C.). Contact with moisture is avoided during this step. The consistency of the chocolate formulation after mixing is typically that of soft putty.

After mixing, the chocolate formulation is refined to reduce the solids, in particular the sugar, to the desired maximum particle size, typically from about 0.008 to about 0.0016 inches (from about 20 to about 40 microns). This refining step also coats the solids with the fat. Typically, four or five water-cooled rolls, each progressively faster in speed, are used to refine the formulation. Pressure between the rolls is adjusted to achieve the desired fineness for the solids. As in the dry mixing step, contact with moisture is avoided during refining. In particular, the rolls are not cooled to or below the dewpoint of ambient air. The consistency of the chocolate after refining is that of flakes or a heavy putty.

After refining, the chocolate formulation is dry-conched to remelt and redistribute the fat to the surface of the solids in the refined mix. The moixture content of the mix is reduced to about 1% or less. Certain volatile compounds are also removed which improves the flavor. In this dry conching step, flakes from the refining step are first broken into a powdery mass in a mixer which is heated to at least about 120° F. (49° C.). When this temperature is reached, the fat is added as needed such that the consistency of the mass is that of very soft putty. The fat content of the mass at this point is typically on the order of about 28%. The contents of the mixer can be adjusted to a temperature of from about 120° to about 150° f. (from about 49° to about 66° C.) for milk chocolate and to a temperature of from about 120° to about 180° F. (from about 49° to about 82° C.) for sweet dark chocolate or chocolate coatings. The total time required for this dry-conching step can range from about 3 to about 72 hours.

After dry-conching, the chocolate formulation is wet conched. During wet conching, the remaining fat and lecithin are added to adjust the viscosity of the mass to that required for the intended application. Mixing is continued, typically for about 15 to about 60 minutes, during wet-conching. The temperature of the mass is also typically reduced to about 120° F. (49° C.).

After wet-conching, the chocolate mass is then tempered to form the critical beta-3 seed crystals in sufficient quantity so that the fat crystallizes almost entirely into the beta-3 phase upon cooling during molding or enrobing. During this tempering step, the chocolate mass is adjusted as necessary to a temperature of from about 104° to about 120° F. (from about 40° to about 50° C.) to destroy any fat crystals. The liquid chocolate is then cooled to a temperature of from 22° to 25° C. to start formation of beta-prime fat crystals. Formation of these fat crystals can be detected by an increase in viscosity of the chocolate or by a leveling off or rise in the temperature of the chocolate due to the heat of crystallization. During formation of these beta-prime fat crystals, a small portion thereof transform to the desired beta-3 phase to form the necessary beta-3 seed crystals. After the beta-3 seed crystals have formed, the chocolate is then reheated (e.g., to a temperature of from 84° to 86° F. (from 29° to 30° C.)) in order to melt all of the beta-prime fat crystals, while leaving unmelted the desired beta-3 seed crystals. (As the St:P ratio of the fat decreases to 0.2 or less, the reheating temperature is generally 1° to 2° C. lower than in standard chocolate making.) During this melting process, the viscosity of the mass falls sharply to attain a fluidity approximately that of the mass prior to tempering.

After tempering, the molten chocolate mass can then be molded or used for enrobing. During this molding-/enrobing step, the molten chocolate (temperature of from 84° to 86° F. (29° to 30° C.)) is cooled to a temperature of about 60° F. (15.7° C.) to solidify the chocolate. The solid chocolate or chocolate enrobed product is then typically stored at a temperature of from about 60° to about 65° F. to prevent bloom and textural changes. This molded/enrobed chocolate can be used in a number of different applications, including chocolate candy bars, chocolate chips, chocolate enrobed cookies, and the like.

Using a chocolate composition of the present invention, a milk chocolate candy bar was made as follows:

The formulation used to prepare this milk chocolate candy bar is presented in the following table:

| Ingredient | % | Wt. (g) |
|---|---|---|
| Sucrose | 49.65 | 933.0 |
| Milk solids | 15.0 | 300.0 |
| Vanillin | 0.05 | 1.0 |
| Chocolate liquor | 15.0 | 300.0 |
| Add fat* | 18.0 | 360.0 |
| Butterfat | 2.0 | 40.0 |
| Lecithin | 0.3 | 6.0 |
| | 100.0 | 2000.0 |

*95% POP fat, 5% CRISCO Oil

The dry ingredients (sucrose, milk solids and vanillin) were weighed together and the mixed in a Hobart Mixer, Model C-100 set at speed No. 1. The chocolate liquor, 200 g of the added fat (23-24% total fat in the mixture at this point) and ⅓ of the lecithin (2.0 g.) were weighed together, melted, mixed and then added to the dry ingredients. With continual mixing, and occasional heating supplied by a hot plate, the mixture became a soft, putty-like mass in about 15 minutes.

This soft, putty-like mass was refined by feeding it slowly into a 4-roll refiner. The rolls were water-cooled to about 70° to 72° F. (21.1° to 22.2° C.) which was above the dew point of the ambient air. The rolls were hydraulicilly pressurized to obtain an acceptable sugar particle size. The rolls were successively faster in speed with the chocolate mixing being automatically scraped from the upper roll as fine, thin flaks. The weight of flakes recovered 1739.0 g. compared to the initial mix weight of 1796.0 g. This ratio of these weights provided a correction factor of 0.968 which was used in calculating the amounts of fat and lecithin to be added in subsequent steps.

The refined chocolate was then placed into a 3-quart jacketed mixing bowl. An amount (116.2 g.) of fat required to bring the chocolate mass to a total fat content of 28 to 29% was melted and then added. The chocolate mass was then conched in a Hobart mixer, Model C-100 set at speed No. 2. Water having a temperature of 125° F. (51.7° C.) was circulated through the jacket of the mixing bowl. This conching step was continued for a period of 48 hours.

In the wet conching step, 38.7 g. of added fat and 38.7 g. of butterfat were melted and then added (total fat content of the mass now 32 to 33%), along with the final ⅔ (3.9 g.) of the lecithin. The mass was mixed for a period of 15 minutes at a temperature of 125° F. (52° C.).

Using a jacketed tempering pot (1.5 l. capacity) equipped with a fixed-speed agitator (40 rpm) and a temperature probe, and a series of water baths set at about 55° C., about 32° to 34° C., and about 20° to 21° C., the chocolate mass was tempered, with continual temperature monitoring and observation of viscosity, as follows: The chocolate mass was warmed to 49° C. by circulating water from the 55° C. bath through the jacket of the pot. The warmed mass as then cooled, first to 35° C. by circulating water from the 32° to 34° C. bath through the jacket, and then to the temperature of crystallization (22.8° C.) by circulating water from the 20° to 21° C. bath through the jacket. When crystallization had occurred, as evidenced by an increase in viscosity, loss of shiny appearance, and, most importantly, by a rise in temperature of the chocolate mass of approximately 0.1° C., the water from the 32° to 34° C. bath was again circulated through the jacket. As a result, the chocolate mass was reheated to the necessary temperature of 29.0° C. to melt the beta-prime crystals, leaving behind the desired beta-3 seed crystals.

The molten chocolate mass was then transferred from the tempering pot to a 30-bar mold, 9 in. (22.9 cm) wide by 22 in. (55.9 cm) in length and approximately 0.3 cm in depth. The temperature of the mold was 75° to 80° F. (23.9° to 26.7° C.). The chocolate in the mold was then cooled in a cooling tunnel by air at 60° F. (15.6° C.) for about 13 minutes. The molded chocolate was then placed in a 60° F. (15.6° C.) constant temperature room for subsequent demolding and storage.

What is claimed is:

1. A flavored confectionery composition, which comprises a flavor enhancing amount of a flavor component and from about 20 to about 45% by weight of the composition of a fat component having an St:P weight ratio of about 0.8 or less and consisting essentially of:
   (1) from 0 to about 70% by weight cocoa butter;
   (2) up to about 20% by weight butter fat; and
   (3) from about 30 to 100% by weight of a fat having an St:P weight ratio of about 0.2 or less and which comprises:
      (a) at least about 70% SOS trigylcerides;
      (b) from about 4 to about 20% combined SUU/UUU/SLS triglycerides,
      (c) about 8% or less SLS triglycerides;
      (d) about 9.5% or less SSO triglycerides;
      (e) about 2.5% or less SSS triglycerides; and
      (f) up to about 4% other glycerides;
wherein S is stearic (St) or palmitic (P); U is oleic (O) or linoleic (L).

2. The composition of claim 1 wherein said SOS triglycerides comprise at least about 80% by weight of said fat component.

3. The composition of claim 2 wherein said combined SUU/UUU/SLS triglycerides comprise from about 8 to about 15% by weight of said fat component.

4. The composition of claim 1 wherein the St:P weight ratio of said fat component is about 0.5 or less.

5. The composition of claim 4 wherein the level of StOSt triglycerides is about 20% or less by weight of said SOS triglycerides.

6. The composition of claim 5 wherein said SSO triglycerides comprise about 6% or less by weight of said fat component.

7. The composition of claim 6 wherein said SSS triglycerides comprise about 2% or less by weight of said fat component.

8. The composition of claim 6 wherein the St:P weight ratio of said fat component is about 0.3 or less.

9. The composition of claim 1 wherein said flavor component comprises a chocolate flavor.

10. The composition of claim 9 which further comprises sugar, a sugar alcohol or a mixture thereof in an amount of from about 40 to about 60% by weight of the composition.

11. The composition of claim 10 in the form of a chocolate candy bar.

12. The composition of claim 10 in the form of chocolate chips.

13. The composition of claim 1, wherein said fat component consists essentially of from about 50 to 100% by weight of said fat having an St:P ratio of about 0.2 or less, and from 0 to about 50% by weight of said cocoa butter.

* * * * *